United States Patent
Isayeva

(10) Patent No.: US 8,965,618 B2
(45) Date of Patent: Feb. 24, 2015

(54) CONTROL STRATEGY FOR AN ELECTRIC MACHINE IN A VEHICLE

(71) Applicant: Ford Global Technologies, LLC, Dearborn, MI (US)

(72) Inventor: Rimma Isayeva, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/039,901

(22) Filed: Sep. 27, 2013

(65) Prior Publication Data

US 2014/0277882 A1    Sep. 18, 2014

Related U.S. Application Data

(60) Provisional application No. 61/788,929, filed on Mar. 15, 2013.

(51) Int. Cl.
*B60L 11/00* (2006.01)
*B60T 8/32* (2006.01)
*B60W 20/00* (2006.01)
*H02H 7/09* (2006.01)

(52) U.S. Cl.
CPC ............. *B60W 20/00* (2013.01); *H02H 7/09* (2013.01); *Y10S 903/903* (2013.01)
USPC ........... 701/22; 180/65.285; 701/36; 903/903

(58) Field of Classification Search
USPC ........... 701/22; 307/9.1, 10.1, 10.7; 180/65.1, 180/65.21, 65.265, 65.275, 65.29; 903/903
See application file for complete search history.

(56) References Cited

U.S. PATENT DOCUMENTS

| | | | |
|---|---|---|---|
| 4,734,634 A | 3/1988 | Kito et al. | |
| 6,405,818 B1 | 6/2002 | Anthony et al. | |
| 6,897,629 B2 | 5/2005 | Wilton et al. | |
| 2012/0019231 A1* | 1/2012 | Chen | 323/312 |
| 2014/0001985 A1* | 1/2014 | Zhang et al. | 318/139 |
| 2014/0062348 A1* | 3/2014 | Isayeva et al. | 318/139 |
| 2014/0114512 A1* | 4/2014 | Treharne et al. | 701/22 |
| 2014/0114514 A1* | 4/2014 | Crombez et al. | 701/22 |

* cited by examiner

*Primary Examiner* — Yonel Beaulieu
(74) *Attorney, Agent, or Firm* — David B. Kelley; Brooks Kushman P.C.

(57) ABSTRACT

A system and method for controlling an electric vehicle include at least one controller configured to detect an over-voltage condition when an electric-machine voltage exceeds an over-voltage threshold. In response to the over-voltage condition, the electric machine and a variable voltage controller (VVC) are disabled. Upon determining the electric-machine voltage is decreased to at least a second threshold being less than the over-voltage threshold, the controller is configured to set the VVC to a limited-operation mode. Upon determining the electric-machine voltage is decreased to at least a third threshold being less than the second threshold and the over-voltage threshold, the controller is configured to re-enable the electric machine and set the VVC to a normal-operation mode. The limited operation-mode enables the vehicle to maintain vehicle propulsion during the drive-cycle as the electric machine is recovered from a transient condition causing the over-voltage condition.

19 Claims, 9 Drawing Sheets

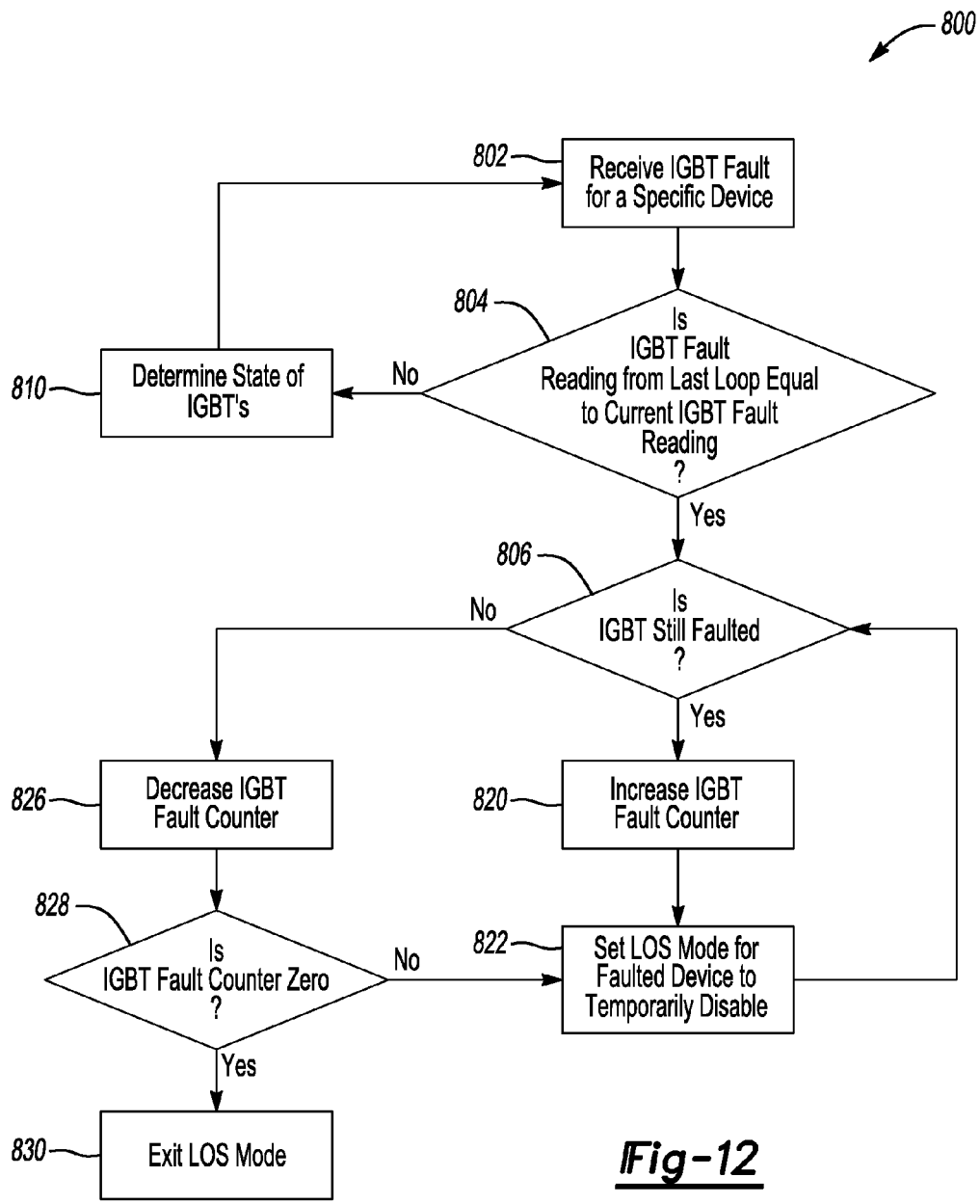

CONTROL STRATEGY FOR AN ELECTRIC MACHINE IN A VEHICLE

CROSS-REFERENCE TO RELATED APPLICATIONS

This application claims the benefit of U.S. provisional Application No. 61/788,929, filed Mar. 15, 2013, the disclosure of which is incorporated in its entirety by reference herein.

TECHNICAL FIELD

The present disclosure relates to a system for controlling an electric machine in an electric vehicle.

BACKGROUND

Battery electric vehicles (BEVs) include a fraction battery that is rechargeable from an external electric power source and powers the electric machine. Hybrid electric vehicles (HEVs) include an internal combustion engine, one or more electric machines, and a traction battery that at least partially powers the electric machine. Plug-in hybrid electric vehicles (PHEVs) are similar to HEVs, but the traction battery in a PHEV is capable of recharging from an external electric power source. These vehicles are examples of vehicles that are capable of being at least partially driven by an electric machine. Similar to conventional powertrains, these vehicles may include limited operation strategy (LOS) modes to enable the operator of the vehicle to continue to drive the vehicle after the controller detects an operating condition or component that may need servicing.

SUMMARY

According to one or more embodiments of the present disclosure a method of controlling a hybrid-electric vehicle may include disabling an electric machine and a variable voltage converter (VVC) when an electric-machine voltage exceeds an over-voltage threshold. Upon determining the electric-machine voltage has decreased to at least a second threshold being less than the over-voltage threshold, the electric machine is re-enabled and the VVC is set to a normal-operation mode.

In another embodiment, the method also includes re-enabling the electric machine during the drive-cycle.

In another embodiment, the method includes disabling the VVC sets the VVC to at a limited-operation mode wherein the limited operation-mode enables the vehicle to maintain vehicle propulsion during the drive-cycle.

In another embodiment, the method also includes commanding the VVC to function in a mode in which high voltage from a high-voltage electric connection is routed to the battery in order to quickly dissipate high-voltage in response to the over-voltage condition.

In another embodiment, in response to the over-voltage condition, the VVC is set to a mode that prevents providing a boost voltage to the at least one electric machine.

According to one or more other embodiments of the present disclosure, an electric-vehicle is providing having a traction battery, at least one electric machine, and a variable voltage converter (VVC). The electric-vehicle includes at least one controller configured to detect an over-voltage condition when an electric-machine voltage exceeds an over-voltage threshold. In response to the over-voltage condition, the electric machine and the VVC are disabled. Upon determining the electric-machine voltage is decreased to at least a safety threshold being less than the over-voltage threshold, the controller is configured to set the VVC to a limited-operation mode. Upon determining the electric-machine voltage is decreased to at least a third threshold being less than the safety threshold and the over-voltage threshold, the controller is configured to re-enable the electric machine and set the VVC to a normal-operation mode. The limited operation-mode enables the vehicle to maintain vehicle propulsion during the drive-cycle as the electric machine is recovered from a transient condition causing the over-voltage condition.

In another embodiment, the electric machine includes at least one inverter, wherein the over-voltage condition occurs on one the at least one inverter.

In another embodiment, the over-voltage condition occurs on at least one insulated-gate bipolar transistor (IGBT).

In another embodiment, the electric-vehicle includes an inverter and the controller is also configured to command the VVC to function in a bypass-mode where voltage from the inverter is routed to the battery while the electric machine is disabled.

In another embodiment, the at least one controller is also configured to re-enable the electric machine during the drive cycle.

According to one or more embodiments of the present disclosure a method of controlling a hybrid-electric vehicle may include detecting an over-voltage condition when an electric-machine voltage exceeds an over-voltage threshold. The electric machine is disabled in response to the over-voltage condition. Upon determining the electric-machine voltage decreased to at least a safety threshold being less than the over-voltage threshold, a variable voltage converter (VVC) is set to a limited-operation mode. Upon determining the electric-machine voltage decreased to at least a third threshold being less than the safety threshold and over-voltage threshold, the electric machine is re-enabled and the VVC is set to a normal-operation mode. The limited operation-mode enables the vehicle to maintain vehicle propulsion during the drive-cycle.

In another embodiment, in response to the over-voltage condition, the VVC is set to a mode that prevents providing a boost voltage to the at least one electric machine.

BRIEF DESCRIPTION OF THE DRAWINGS

FIG. 12 is a flow chart of another algorithm implemented in the control system of the vehicle of FIG. 1 according to one embodiment of the disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
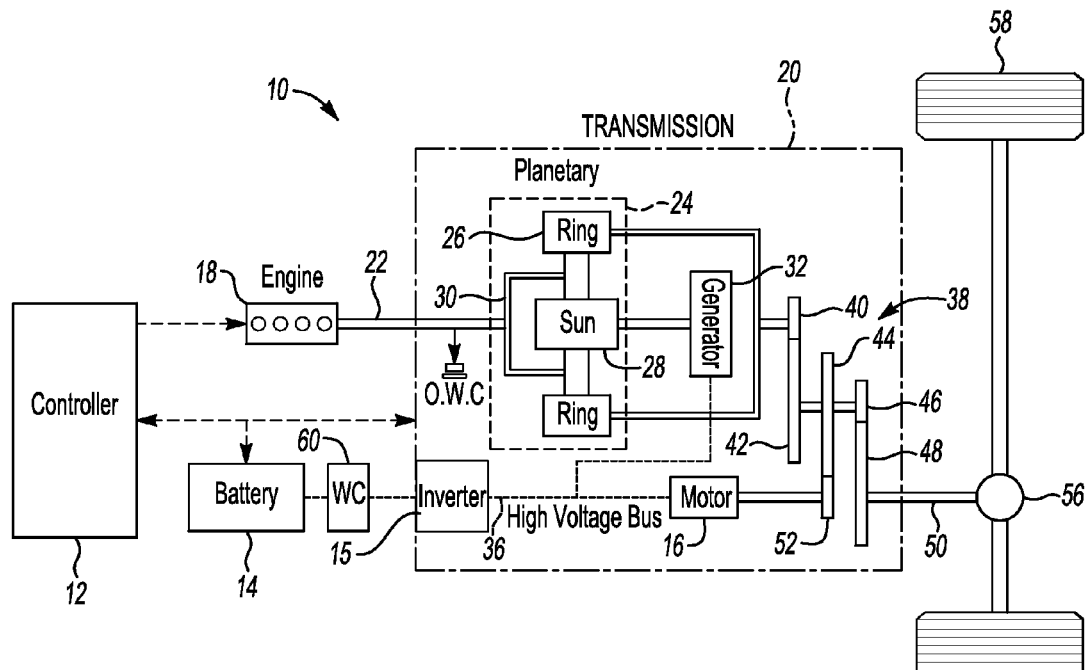
FIG. 1 is a schematic diagram of a hybrid-electric vehicle according to one embodiment of the disclosure.

Referring to FIG. 1, a hybrid-electric vehicle 10 is illustrated having a power-split powertrain. A vehicle control system 12 is provided, and can generally be referred to as a controller. The vehicle control system 12 controls the power distribution in the powertrain or driveline of the vehicle 10.

The vehicle 10 includes a traction battery 14. The battery 14 has a two-way electrical connection, such that the battery 14 receives and stores electric energy through regenerative braking, for example. The battery 14 also supplies the energy to an electric machine, such as an electric traction motor 16.

Although the control system 12 of the vehicle 10 is illustrated in FIG. 1 as a single controller, such a control system can include more than one controller, as desired. For example, a separate battery control module can directly control the battery 14. Furthermore, a separate motor control module can be directly connected to the motor 16 and to the other controllers in the vehicle 10. It should be understood that all contemplated controllers in the vehicle 10 can be referred to as a "controller", and the vehicle control system 12 is not necessarily limited to only one controller. Separate additional controllers and their hierarchy will be described in more detail in FIG. 2.

An inverter 15 is provided to converts direct current (DC) from the battery into alternating current (AC) for powering the electric machine. The inverter 15 may also selectively enable/disable electrical flow from the battery 14 to the motor 16. Alternatively, during regenerative braking, the inverter 15 converts AC from the electric machine into DC such that electric power is stored in the battery 14.

An internal combustion engine 18 is also a power source for the vehicle 10. The vehicle control system 12 controls the operation of engine 18. Both the motor 16 and the engine 18 are capable of powering a transmission 20 that ultimately delivers torque to the wheels of the vehicle 10.

The engine 18 delivers power to a torque input shaft 22 that is connected to a planetary gear set 24 via a one way clutch. The input shaft 22 powers the planetary gear set 24. The planetary gear set 24 includes a ring gear 26, a sun gear 28, and a planetary carrier assembly 30. The input shaft 22 can be driveably connected to the carrier assembly 30 which, when powered, can rotate the ring gear 26 and/or the sun gear 28. The sun gear 28 can be driveably connected to a generator 32. The generator 32 may be engaged with the sun gear 28, such that the generator 32 may either rotate with the sun gear 28, or can be disengaged so that the generator 32 does not rotate with the sun gear 28. Like the motor 16, the generator 32 may be referred to as an electric machine which, when utilized in other vehicle powertrain configurations, is capable of both generating electric power and providing motive power.

When the engine 18 is driveably coupled to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36. The vehicle control system 12 controls the components in the powertrain to provide proper torque distribution to the wheels.

It should be understood that the motor 16 and the generator 32 can both be referred to as an electric machine. Each electric machine can operate as a generator by receiving torque from the engine 18 and supplying AC voltage to the inverter 15, whereby the inverter 15 converts the voltage into DC voltage to charge the battery 14. Each electric machine can also operate as a generator by utilizing regenerative braking to convert the braking energy of the vehicle into electric energy to be stored in the battery 14. Alternatively, each electric machine can operate as a motor whereby the electric machine receives power from the inverter 15 and the battery 14 and provides torque through transmission 20 and ultimately to the wheels 58.

The inverter 15 selectively powers the motor 16 and the generator 32. The inverter 15 can include a motor inverter for selectively disabling the motor 16, and a generator inverter for selectively disabling the generator 32.

The vehicle 10 can also include a variable voltage converter (VVC) 60, or also referred to as a boost converter, for varying voltage between the battery 14 and the motor 16 and the generator 32. The VVC 60 is used to boost the battery 14 voltage to a higher voltage. The higher voltage in a hybrid-electric drivetrain system can be used for multiple purposes such as torque capability optimization for electric machines, system loss optimization, and well other hybrid-electric system optimization. The VVC 60 allows the vehicle 10 to use a smaller battery pack with lower voltage while maintaining the functionally associated with the higher voltage. A smaller battery pack may have advantages such as lower cost, smaller size and less packaging restraints, for example. The VVC 60 will be described in more detail in FIG. 3 and FIG. 4.

The vehicle 10 may be powered by the engine 18 alone, by the engine 18 and generator 32 alone, by the battery 14 and motor 16 alone, or by a combination of the engine 18, battery 14, motor 16 and generator 32. In a mechanical drive mode, or a first mode of operation, the engine 18 is activated to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the mechanical drive mode, the motor 16 may also be activated to assist the engine 18 in powering the transmission 20. When the motor 16 is active in assisting, gear 52 distributes torque to gear 44 and to the countershaft.

In an electric drive mode (EV mode), or a second mode of operation, the engine 18 is disabled or otherwise prevented from distributing torque to the torque output shaft 50. In the EV mode, the battery 14 powers the motor 16 to distribute torque through the step ratio gears 38 and to the torque output shaft 50. The torque output shaft 50 is connected to a differential and axle mechanism 56 which distributes torque to traction wheels 58. The vehicle control system 12 controls each of the battery 14, motor 16, engine 18 and generator 32 to distribute torque to the wheels 58 in either the mechanical drive mode or the EV mode according to driver torque demands.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

It should be understood that while a power-split powertrain is illustrated in the vehicle 10, the vehicle 10 can include many other configurations. As such, it is contemplated that individual components of the powertrain may differ to suit various particular applications. For example, in another configuration that does not include a planetary gear set 24, an electric machine (motor/generator) can be provided to operate as a generator by receiving torque from the engine or regenerative braking, while the same electric machine can also operate as a motor by receiving power from the traction battery and providing torque through the transmission. Other vehicle configurations of vehicle powertrains and implementations of electric machines are contemplated, and are therefore considered to be within the scope of the present disclosure.

Figure 2:
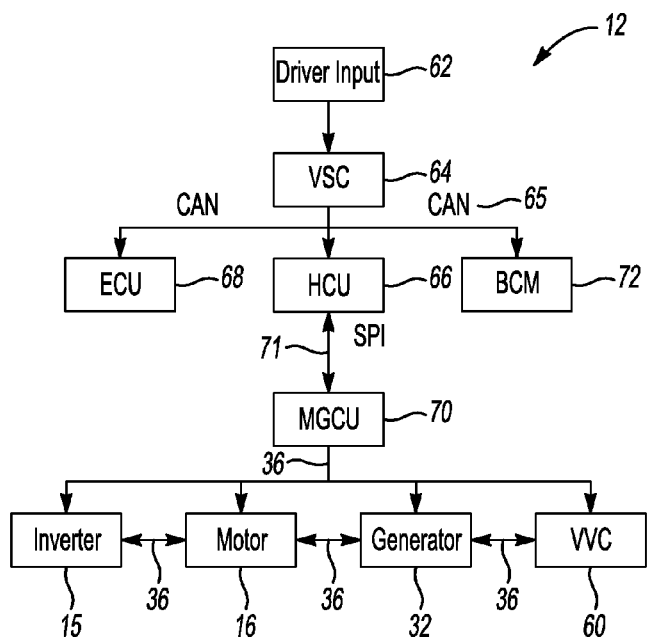
FIG. 2 is a block diagram illustrating an example of a control system of the vehicle of FIG. 1.

Referring to FIG. 2, a block diagram illustrating a vehicle control system 12 within the vehicle 10 is shown. A driver inputs a request 62, such as pressing the accelerator to input an acceleration request or pressing the brake pedal to input a braking request, for example. The driver inputs 62 are received by a vehicle system controller (VSC) 64. The VSC 64 processes these driver inputs 62 and communicates commands throughout the vehicle 10.

The vehicle control system 12 may be electrically connected to with various subsystems in the vehicle 10 and acts as an overall controller of the vehicle 10. The VSC may be electrically connected to and communicate with various subsystems through a vehicle network 65. The vehicle network 65 continuously broadcasts data and information to the vehicle-based systems. The vehicle network 65 may be a controlled area network (CAN) bus used to pass data to and from the VSC 64 and other various controllers or subsystems or components thereof. For example, as shown in FIG. 2, the VSC 64 can be connected to a hybrid control unit (HCU) 66, a battery control module (BCM) 72 and an engine control unit (ECU) 68 through the vehicle network 65.

The HCU 66 that controls the hybrid-specific components in the vehicle 10, such as the motor 16, the generator 32, the battery 14 and/or the inverter 15. The HCU 66 is communicatively connected to the ECU 68 such that the HCU 66 may command the ECU 68 to control the engine 18 in various manners. A battery control module (BCM) 72 may also communicate with the HCU 66. The BCM 72 may receive commands from the HCU 66 and controls the power distribution of the battery 14.

The HCU 66 is also communicatively connected to a motor/generator control unit (MGCU) 70. The MGCU 70 communicates with the HCU 66 through a Serial Peripheral Interface (SPI) 71. SPI 71 is four-wire serial bus. The SPI 71 is an extremely simple hardware interface and is not limited to any maximum clock speed, thus enabling potentially high throughput. The MGCU 70 receives commands from the HCU 66 and controls the motor 16, the generator 32, and VVC 60. As further illustrated in FIG. 2, the MGCU 70 is communicatively connected to inverter 15. The motor/generator inverters 15 receive commands from the MGCU 70 and open and close switches within the inverter 15 to enable and disable power flow to and from the electric machines.

Previous hybrid-electric vehicles used one control module to control the motor, generator and VVC. Within the control module, one microcontroller was used to control the motor and another microcontroller to control the generator while a third controller controlled the VVC. However, it was found to be difficult to control the VVC when it was separated from the motor/generator and it was found to be too slow in conveying information from the motor or generator to the VVC controller in the HCU. Therefore, it is advantageous to control the VVC, the motor, the generator and the respective inverters from one controller such as the MGCU shown in FIG. 2.

A hierarchy of controllers is thus provided in the illustration shown in FIG. 2. Other hierarchies of controllers are contemplated without deviating from the scope of the present disclosure. For example, the VSC 64 may directly communicate with the MGCU 70 without the presence of an HCU 66. Other configurations are contemplated that would be beneficial for different particular vehicle architectures.

The vehicle control system 12 controls each of the controllers, according to requested torque and power demands. It should again be understood that more or less controllers than those described herein are contemplated, and one or more of these controllers can communicatively cooperate to accomplish certain tasks. Any and all of these controllers or combination thereof can simply be referred to as a "controller".

Figure 3:
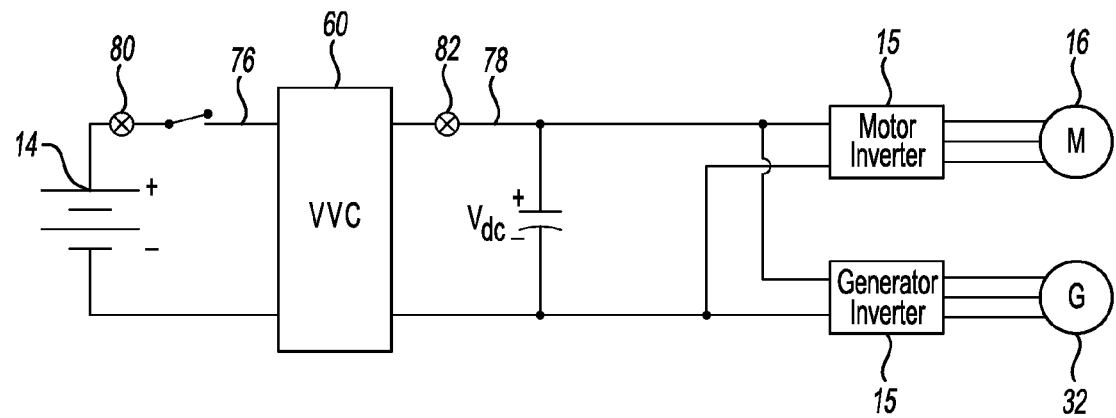
FIG. 3 is a schematic illustration of a portion of the vehicle of FIG. 1.
Figure 4:
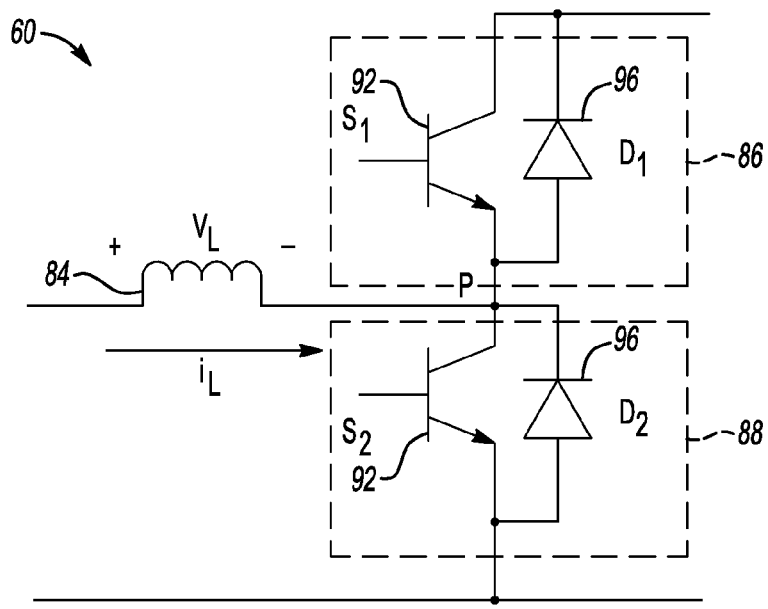
FIG. 4 is a schematic illustration of a Variable Voltage Converter (VVC) of FIG. 3.

Referring now to FIG. 3 and FIG. 4, a schematic diagram of a portion of hybrid-electric vehicle 10 and vehicle control system 12 is described in more detail. As previously discussed, the VVC 60 is communicatively connected and controlled by the MGCU. Further, the VVC 60 is connected to the motor/generator inverter. Specifically, the VVC 60 is used to boost the battery 14 voltage to a higher level voltage in a HEV drivetrain system for multi-purposes such as, but not limited to, torque capability optimizations for electric machines and system loss optimization.

The battery 14 is connected to the VVC 60 along an input side 76. The battery 14 supplies a low voltage to the VVC 60. The VVC 60 then boosts the low voltage from the battery 14 into a higher voltage and outputs the higher voltage to an output side 78. The output side 78 of the VVC 60 is supplying the high voltage to the high voltage bus 36 for use by the inverter 15 and subsequently the motor 16 and generator 32. As shown in FIG. 3, the motor 16 and generator 32 may each have a separate inverter 15. While the VVC 60 is described as having an input side and an output side, it should be noted that in a motoring mode, the path flows from the battery through the VVC to the high voltage bus. Conversely, in a regeneration mode, the path is reversed.

A sensor 80 is located between the battery 14 and VVC to measure to the voltage signal along the input side 76 of the VVC 60. More specifically, the sensor 80 provides a voltage signal indicating the voltage from the battery 14. A second sensor 82 is located along the output side 78 between the VVC 60 and the inverters 15. The sensor 82 provides a signal indicating voltage from the high voltage bus 36. The sensors 80, 82 provide a signal indicative of the measured voltage along the input side 76 and the output side 78 respectively. During normal operating conditions, the measured voltage signal is from the sensors 80, 82 is within an appropriate specified range. However, if the measured voltage signal from the sensors deviates from the appropriate specified range, this may indicate a service condition has occurred or that one of the sensors 80, 82 is inoperative or malfunctioning.

Referring to FIG. 4, a schematic diagram of the VVC 60 circuitry is illustrated. The VVC 60 generally consists of an inductor 84, two power switches 86 and 88, and related gate drive circuits 90 as shows in FIG. 4. The two power switches 86, 88 are composed of an insulated-gate bipolar transistor (IGBT) 92 and an anti-parallel diode 96. As shown in FIG. 4, the switches are arranged as an upper switch 86 and lower switch 88. There are also several IGBTs 92 associated with the inverter 15 for each of the motor 16 and generator 32, as illustrated in FIG. 4.

The circuitry arrangement of the VVC 60 allows for bi-directional power flow depending on the vehicle requirements, such as motoring or regeneration, for example. For example, when the upper switch 86 is closed and the lower switch 88 is open, power flows in one direction through the anti-parallel diode 96. Similarly, if the upper switch 86 is open and the lower switch 88 is closed, power flows in one direction through the anti-parallel diode 96. However, when both the upper switch 86 and lower switch 88 are closed, bi-directional power flow occurs and generates voltage boost. The boost voltage generated is output to the inverter 15 which controls the motor 16 and generator 32. As discussed previously, by allowing voltage boost through the VVC 60, the vehicle may be able to have a smaller battery pack, thereby saving cost, and battery packaging space, for example.

Certain operating conditions can be detected by one or more of the controllers that may indicate a service condition in each one of the powertrain components, such as the motor 16, the generator 32, the VVC 60 or the inverter 15. When a service condition in one of the components is detected, a limited operation strategy (LOS) can be implemented to enable the operator of the vehicle to continue to drive while certain individual components are disabled. This prevents complete shutdown of the vehicle 10, which can be undesirable to drivers. The service conditions that may cause the vehicle 10 and/or vehicle control system 12 to enter a LOS mode can include temperature, current and/or voltage of a powertrain component being outside an acceptable threshold. A service condition may be caused by a transient event and may be only temporary; however, a reading of a value outside a threshold can cause the vehicle control system 12 to command an individual shutdown of that component, while commanding a LOS mode to allow the operator of the vehicle 10 to continue driving.

Figure 5:
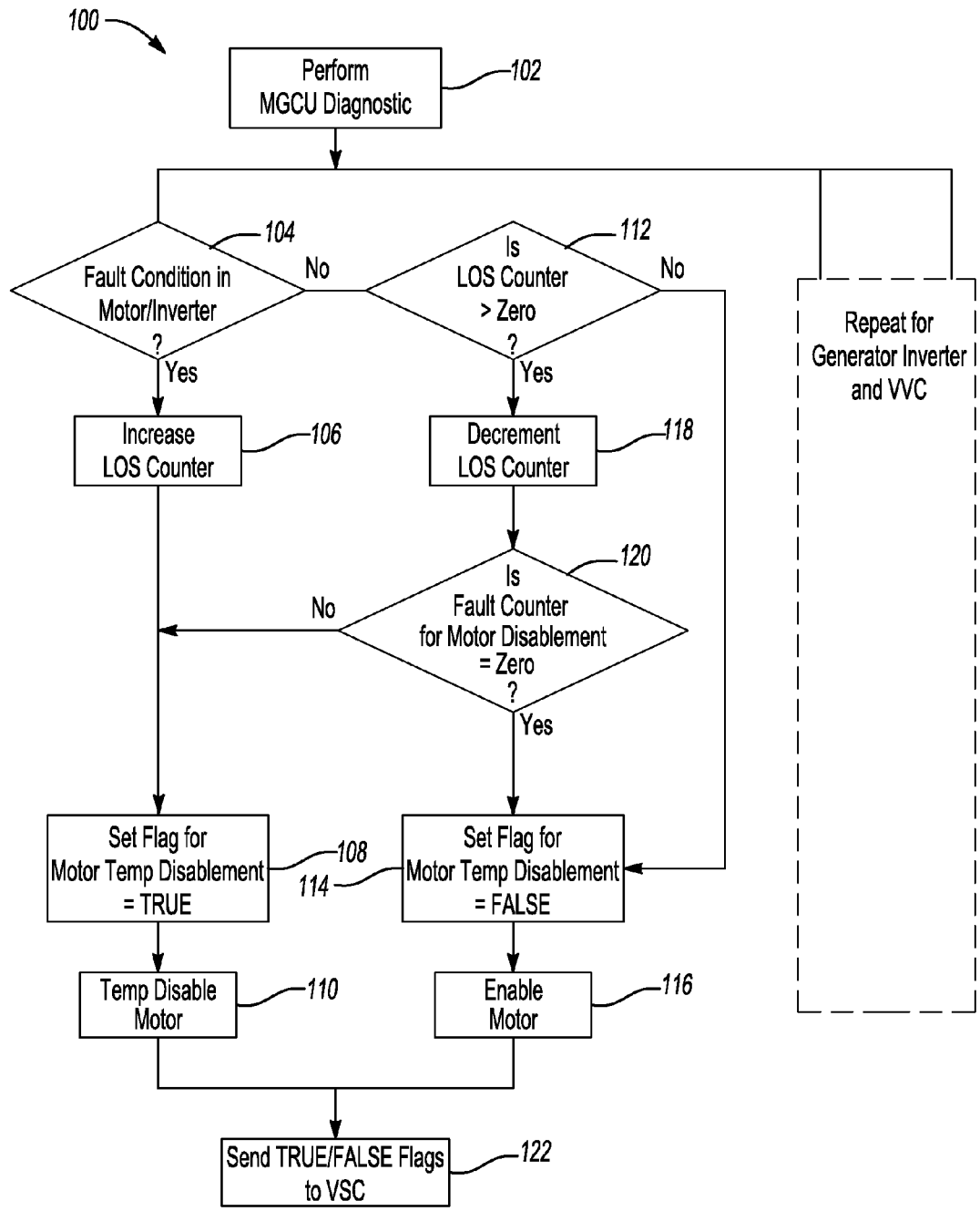
FIG. 5 is a flow chart of an algorithm implemented in a control system of the vehicle of FIG. 1 according to one embodiment of the disclosure.

Referring now to FIG. 5, one embodiment of the LOS mode is illustrated at 100. A diagnostic is performed on each of the motor 16, the generator 32, the VVC 60 and the inverter 15 associated with each of the electric machines. The diagnostic determines if the LOS mode is necessary such that a temporary disabling of that component should be commanded. The MGCU 70 begins performing the diagnostic, as represented by block 102. Next, as represented by block 104, it is determined whether or not a service condition exists in the motor and/or motor inverter. If there is such a service condition, an LOS counter is increased, as represented by block 106. The LOS counter can be a single digit counter or identification means. Once the LOS counter is increased by one, as represented by block 108, a motor temporary disablement flag is flagged as TRUE. The motor is requested to be disabled, as represented by block 110. The motor may be disabled by opening switches in the motor inverter or opening another switch associated with the motor.

If there is no service condition in the motor and/or motor inverter, it is then determined whether the LOS counter is greater than zero, as represented by block 112. If the LOS counter is not greater than zero, the motor temporary disablement flag is flagged as FALSE, and the motor is requested to be enabled, or continued to be enabled, as represented by block 116.

However, if the LOS counter is greater than zero, then the LOS counter is decremented or decreased, as represented by block 118. After the LOS counter has been reduced, it is determined whether the counter has reached zero, as represented by block 120. If the LOS counter is zero, then the method proceeds to set the flag for motor disablement to FALSE, as represented by block 114, and the motor is requested to be enabled, or continued to be enabled, as represented by block 116. If the counter remains greater than zero, then the method proceeds again to disable the motor, as represented by blocks 108, 110. Finally, the TRUE and FALSE flags are sent to the vehicle control system, as represented by block 122. Based on the information sent to the vehicle control system, the vehicle can act according to the description provided with reference to FIG. 6.

By requiring that the counter is equal to zero, as represented by block 120, the control system ensures that even if it is determined that there is no condition in the motor and/or the motor inverter, the motor will continue to be temporarily disabled for a period of time if the LOS counter is still above zero. This allows the diagnostic to continue to run multiple times while reducing the LOS counter each time the diagnostic is run, until the counter reaches zero. Multiple checks of the motor and/or the motor inverter are therefore conducted while the motor is disabled before re-enabling the motor if no service condition is detected.

The diagnostic performed by the MGCU works to temporarily disable the motor in the event a service condition is detected. While the motor is temporarily disabled, the vehicle operates in a temporarily reduced power mode. However, if the service condition only exists for a short amount of time (e.g., under 1 second), the LOS mode be discontinued and the motor will be re-enabled quickly, thus reducing the disturbances felt by the operator of the vehicle. It should be understood that the entire diagnostic can be accomplished in less than one second, such as in twenty micro-seconds, and thus the time the motor is temporarily disabled may not be detected by the operator of the vehicle.

As shown in FIG. 5, the LOS mode 100 and the performing of diagnostics operation, as represented by block 102, is performed for the generator and the VVC as well as the motor. The diagnostics are accomplished for the motor, the generator, the associated inverter and the VVC generally simultaneously such that a check for service conditions is continuous in each component. The MGCU can thus temporarily disable any or all of the motor, the generator, or the VVC. It is contemplated that the diagnostics can also be accomplished for other components, such as the engine.

Figure 6:
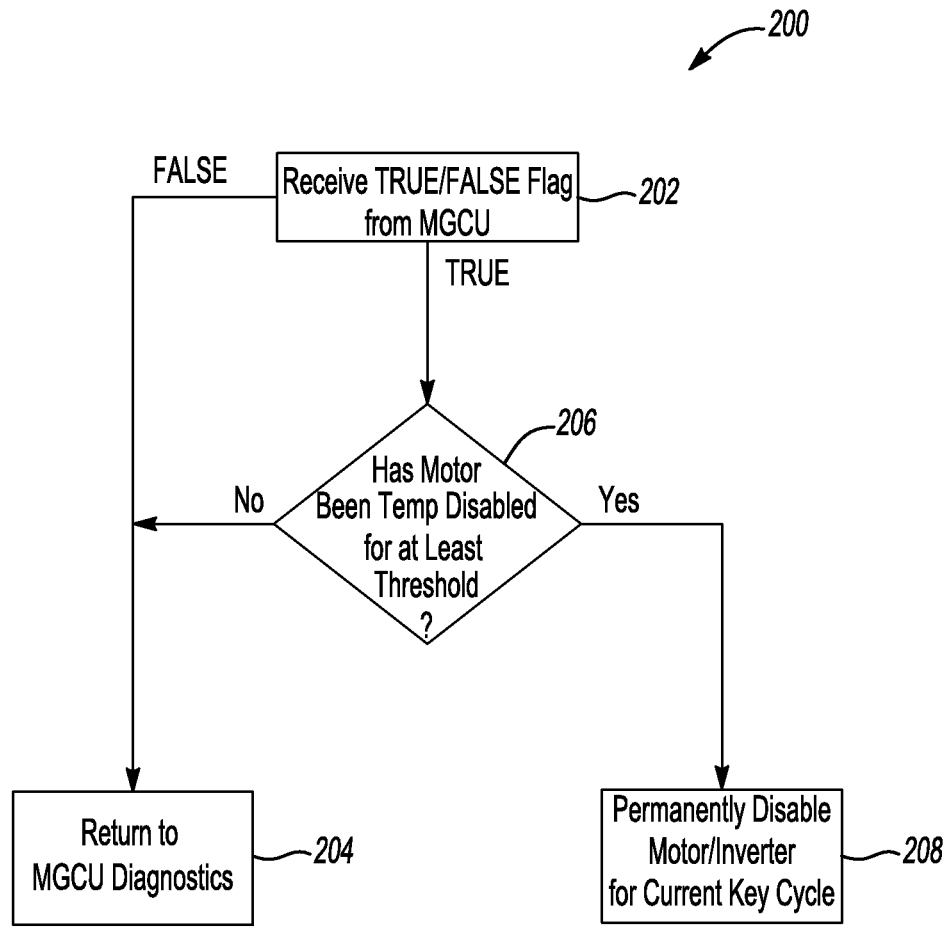
FIG. 6 is a flow chart of another algorithm implemented in the control system of the vehicle of FIG. 1 according to one embodiment of the disclosure.

FIG. 6 illustrates a flowchart 200 of another embodiment of the LOS mode implemented by a controller, or the vehicle control system. As previously described, the MGCU sets a flag for either TRUE or FALSE to temporarily disable or enable the motor, as represented by blocks 108 and 114 respectively. The TRUE and/or FALSE flags are received by the vehicle control system from the MGCU, as represented by block 202. If the flag is FALSE, then the vehicle control system commands the MGCU to return to the diagnostic check 102, as represented by block 204.

However, if the flag is TRUE, then a determination is made as to whether the motor has been temporarily disabled for at least a threshold time, as represented by block 206. If the motor has been disabled for at least the threshold time, then the motor can be permanently disabled for the current key cycle, as represented by block 208. In one embodiment, the threshold time may be approximately one second, such that the motor will be permanently disabled during the current key cycle if it has been temporarily disabled for at least one second. However, any suitable threshold time is contemplated and the threshold time may be variable depending on other factors. A key-cycle may also be referred to as a drive-cycle or power-cycle and is the time from when the vehicle is powered on, i.e. key-on, until the vehicle is shutdown during a key-off. During a new key cycle, the motor, or various other devices such as the VVC or inverter, can be re-enabled, as will be described with reference to FIG. 7.

The algorithms described with reference to FIG. 5 and FIG. 6 provide for a diagnostics check of the motor, the generator, the VVC, or any other powertrain component. In short, if the particular powertrain component is detected to be operating under a service condition, that component is temporarily disabled. Diagnostics continuously run on that component while it is temporarily disabled. If the component recovers from its service condition or the condition was transient so that the component can operate under normal conditions within the time threshold, the component can be re-enabled. If, however, the component fails to recover from its service condition within the time threshold, the component is permanently disabled during the current key cycle, and can only be re-enabled upon a new key cycle (e.g., turning the vehicle off and on).

Figure 7:
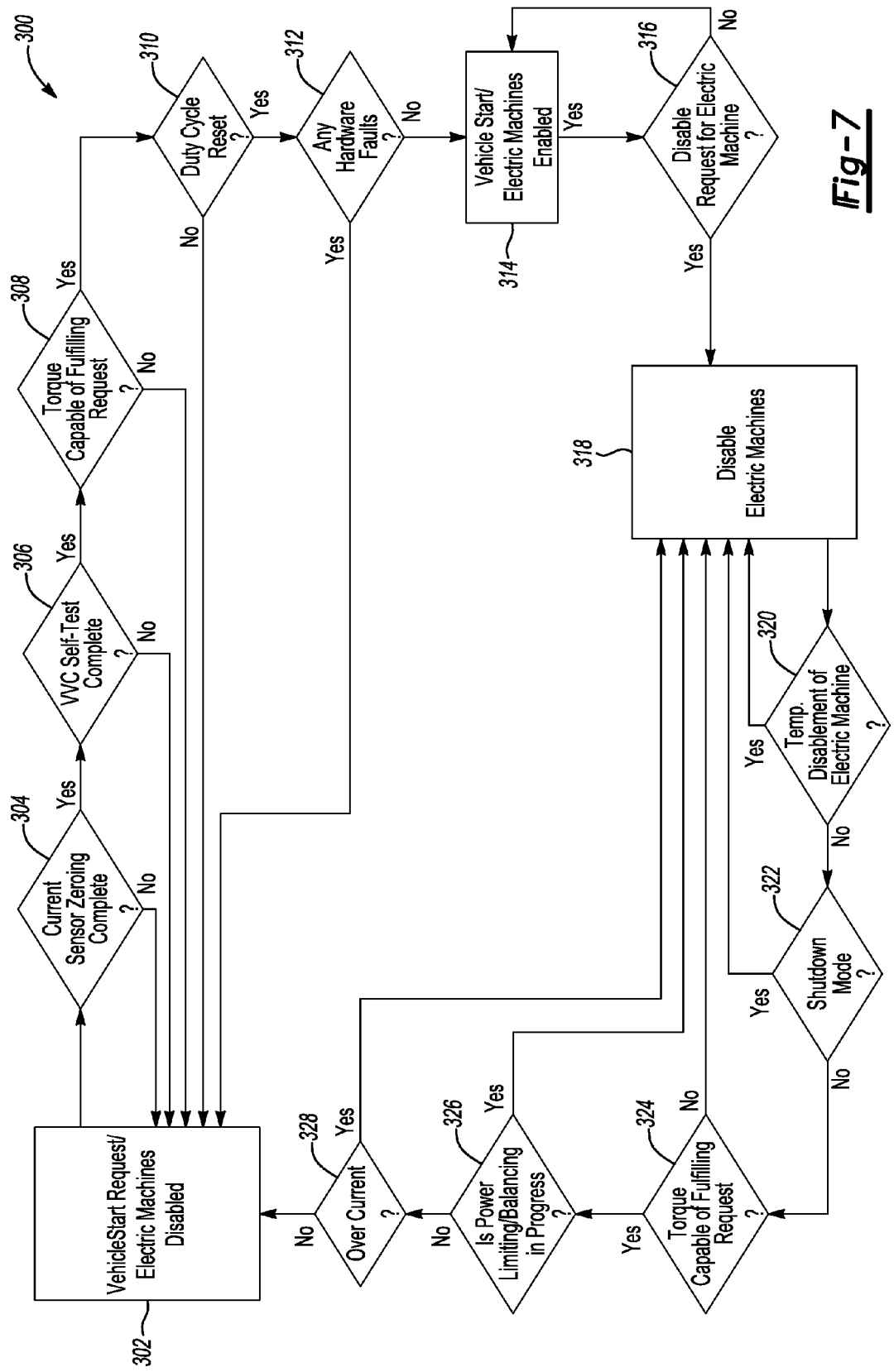
FIG. 7 is a flow chart of another algorithm implemented in the control system of the vehicle of FIG. 1 according to one embodiment of the disclosure.

FIG. 7 illustrates a flowchart 300 of another embodiment of the LOS mode implemented by a controller, or the vehicle control system. As represented by block 302, the vehicle is requested to start, and a new key cycle is commanded. Initially the electric machines, including the motor, generator, as well as the VVC are disabled. A series of pre-start safety checks before initializing of the vehicle.

For example, the vehicle control system checks that the current sensor zeroing is complete, as represented by block 304. The current sensor zeroing must be complete throughout the electric machines. The current sensors must have a zeroed reading while the current is zero in order to have accurate readings for when the current spikes during startup. Next, a self-test of the VVC is accomplished, as represented by block 306. The VVC self-test ensures that any service conditions within the VVC are detected and resolved. Also, a determination is made as to whether there are any torque failures present, as represented by block 308. In other words, the available power and/or torque of the electric machines must be evaluated to determine whether any requested torque can be fulfilled by the electric machines.

The duty cycle commands provided to the electric machine are disabled or reset by the controller, as represented by block 310. Resetting the duty cycle puts the electric machines in a safe mode, thus protecting the hardware. Only after the service conditions are removed can the duty cycle commands be re-enabled, allowing the electric machine to be safely controlled. This is considered to be a "soft restart" in which no new key cycle necessary, rather than a "hard restart" in which the vehicle must be shut down. Finally, as represented by block 312, any service conditions present in the hardware are determined before enabling the vehicle to start.

Once the pre-start safety checks are successfully completed, the vehicle starts and the electric machines can begin, as represented by block 314. The electric machines are also fully enabled, and the vehicle can be driven.

During operation of the vehicle, the diagnostic algorithms described with reference to FIG. 5 and FIG. 6 are accomplished and represented as block 316. The electric machines are continuously checked for service conditions such that any of them can be temporarily disabled, according to the methods previously described.

If a request to disable any of the electric machines is determined at block 316, the electric machine is disabled, as represented by block 318. In order to re-enable the electric machine, the controllers in the vehicle must accomplish a series of safety checks and safety processes before re-enabling the electric machine again at block 314. The safety checks and processes allow the vehicle to continue driving and the electric machines to continue providing propulsion without having a key-cycle.

In one of the safety checks, as represented by block 320, the controller determines whether a temporary disablement of the electric machine is still being required, as previously described in reference to block 110 of FIG. 5. If disabling in not being requested of the electric machines, the controller can determined whether any of the electric machines are requested to be in a shutdown or permanent disablement mode, as represented by block 322. If the electric machines are not disabled, a torque fulfillment check is completed, as represented by block 324. The torque fulfillment check is similar to the check performed with reference to block 308.

Next, a power limiting and balancing check is completed, as represented by block 326. In this check, the controller may determine whether a process is underway in which electrical power is limited to one of the electrical machines or that one of the electric machines does not have power or torque limit much greater than the other electrical machine. The power limiting mode will be described in more detail in FIG. 8. Finally, an over-current check is accomplished as represented by block 328. The over current check determines whether any electric machine is supplied with or is outputting a current value over a given threshold. If all of the safety checks are satisfactory, the prestart/re-enabled checks at are completed starting again at block 302, until the disabled electric machine is re-enabled at block 314.

Figure 8:
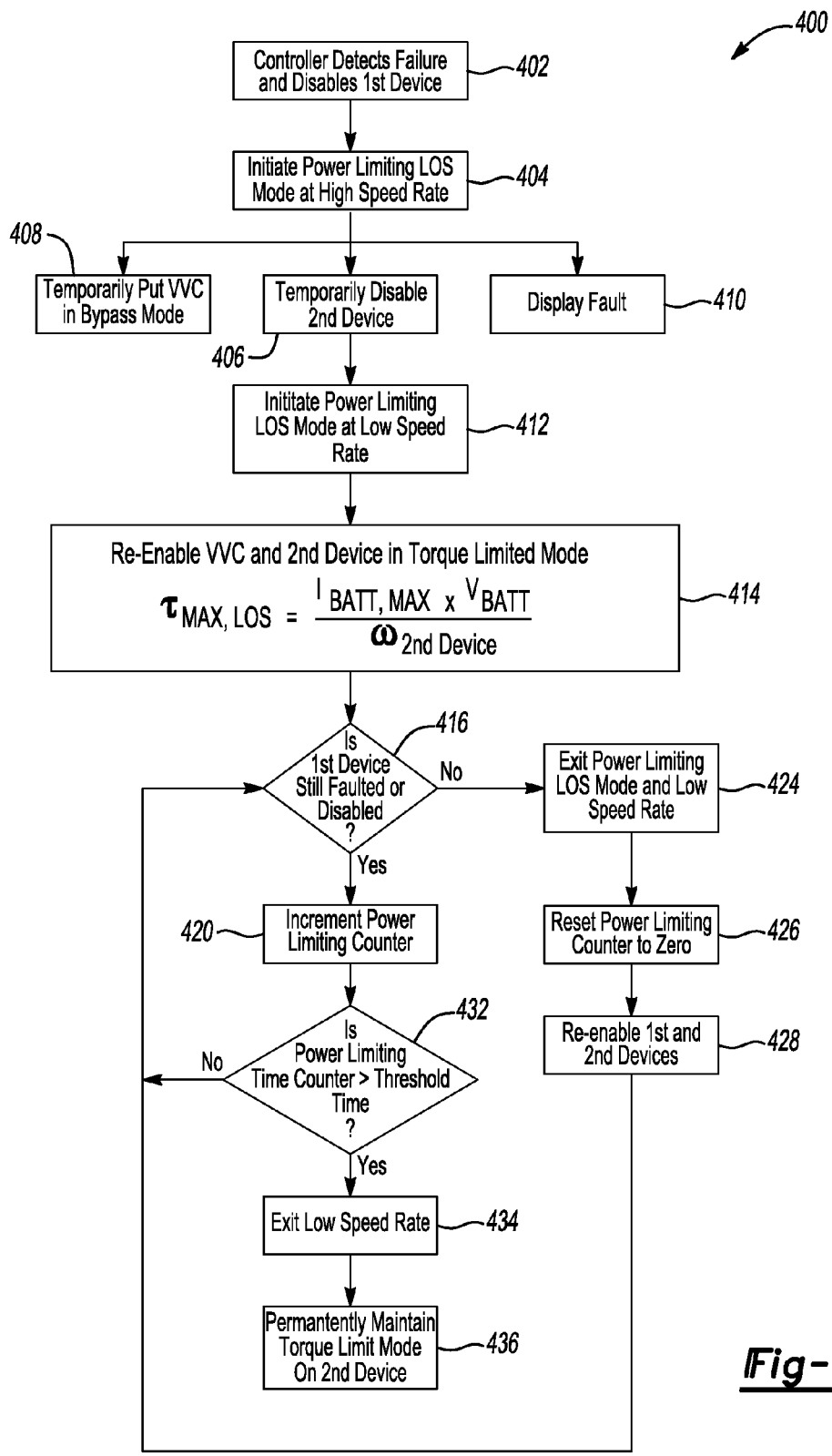
FIG. 8 is a flow chart of another algorithm implemented in the control system of the vehicle of FIG. 1 according to one embodiment of the disclosure.

FIG. 8 illustrates a flowchart 400 of another embodiment of the LOS mode implemented by a controller, or the vehicle control system. FIG. 8 describes a LOS mode where a power limiting mode is implemented when a service condition is detected on one of the electric machines. In previous hybrid-electric vehicles, certain service conditions in a hybrid-electric vehicle drivetrain were difficult to mitigate without reducing vehicle performance while driving or stopping the vehicle completely and then required a key cycle to resume partial operation. A key cycle was used to properly maintain power balance. In a hybrid electric transmission, when a failure is detected on one of the devices, such as an electric machine, taking action on only that device could result in a power imbalance and could lead to unstable performance and additional control-related issues.

To avoid power imbalance and unstable performance, flowchart 400 in FIG. 8 describes the process where the vehicle enters the LOS mode upon failure of one of the electric machines while driving, and continuing to operate the hybrid electric drivetrain with the second electric machine without requiring a key cycle. The process described in flowchart 400 allows the control system to quickly balance power when one of the electric machines fails and allows the other electric machine to continue to provide propulsion to the vehicle.

Initially, as represented by block 402, the control system detects a failure in a first hybrid-electric drivetrain device and disables the device in response to the service condition. The failure may occur in one of the electric machines, or the associated inverters. In response to the service condition and the disabled device, the control system initiates a power limiting mode, as represented by block 404. Initially, the power limiting mode is conducted at a high speed execution rate. The high speed rate may be an execution rate of 100 microseconds, for example.

While still operating in a high speed execution rate, the control system temporarily disables the second device, as represented by block 406. The VVC is also temporarily set to a bypass mode, as represented by block 408. The bypass mode of the VVC allows the high voltage from the electric machines to be quickly dissipated to the low voltage input side of the VVC. A service indicator may also be displayed for the driver, in response to the service condition, as represented by block 410.

After a threshold time, the control system can initiate a power limiting mode at a lower speed execution rate, as represented by block 412. The threshold time may be as short as 20 milliseconds, or any suitable threshold time that is enough time for the high voltage to dissipate so that the devices are not threatened with over-voltage, which could cause more failures. The control system initiates the lower speed execution rate so that additional diagnostics can be performed.

Once the low speed power limiting mode is initiated, the control system re-enables the second device for operation. However, the second device is re-enabled in a torque limited mode, as represented by block 414. In the torque limited mode, torque on the functional device is limited on the functional device based on vehicle operation. The maximum torque in the LOS mode is limited based on the following formula:

$$\tau_{max}=(I_{max} \times V_{battery})/\omega$$

In other words, the maximum torque in the LOS mode is limited based on the maximum allowable current of the high voltage bus in LOS mode multiplied by the voltage from the battery divided by the speed of the second device. In one embodiment, the maximum allowable current in the LOS mode is a fixed value, such as 150 Amps. The battery voltage can be variable.

Once the functional device is re-enabled in a functional mode, the control system checks to determine if the first device is still disabled, as represented by block 416. If the first device is being requested to be disabled by the MGCU or the HCU, or continues to have a failure, a power limiting time counter is incremented, as represented by block 420. However, if there is no service condition and there is no disablement request from one of the controllers, the control system can exit the power limiting mode, as represented by block 424. By exiting the power limiting mode, the control system also exits the low speed execution rate.

The control system then resets the power limiting time counter to zero, as represented by block 426. Once the power limiting time counter is set to zero and the LOS mode is cleared, the control system can also re-enable the first and second devices, as represented by block 428. Re-enabling the devices includes exiting any torque limiting mode and returning to normal function.

On the other hand, if the first device still has a service condition, or the MGCU or HCU are requesting that the device is disabled or set to an LOS mode, the control system determines if the power limiting time counter is greater than a threshold value, as represented by block 432.

If the power limiting time counter has exceeded a threshold value, the low speed diagnostic mode is exited, as represented by block 434. Then the torque limiting mode is permanently maintained for the functional device, as represented by block 436. By maintaining the torque limiting mode, the device is permanently disabled. In some embodiments, the device may only be permanently disabled until a new key-cycle of the vehicle. The device may be set as permanently disabled for several reasons, including the method described in FIGS. 5-7.

Figure 9:
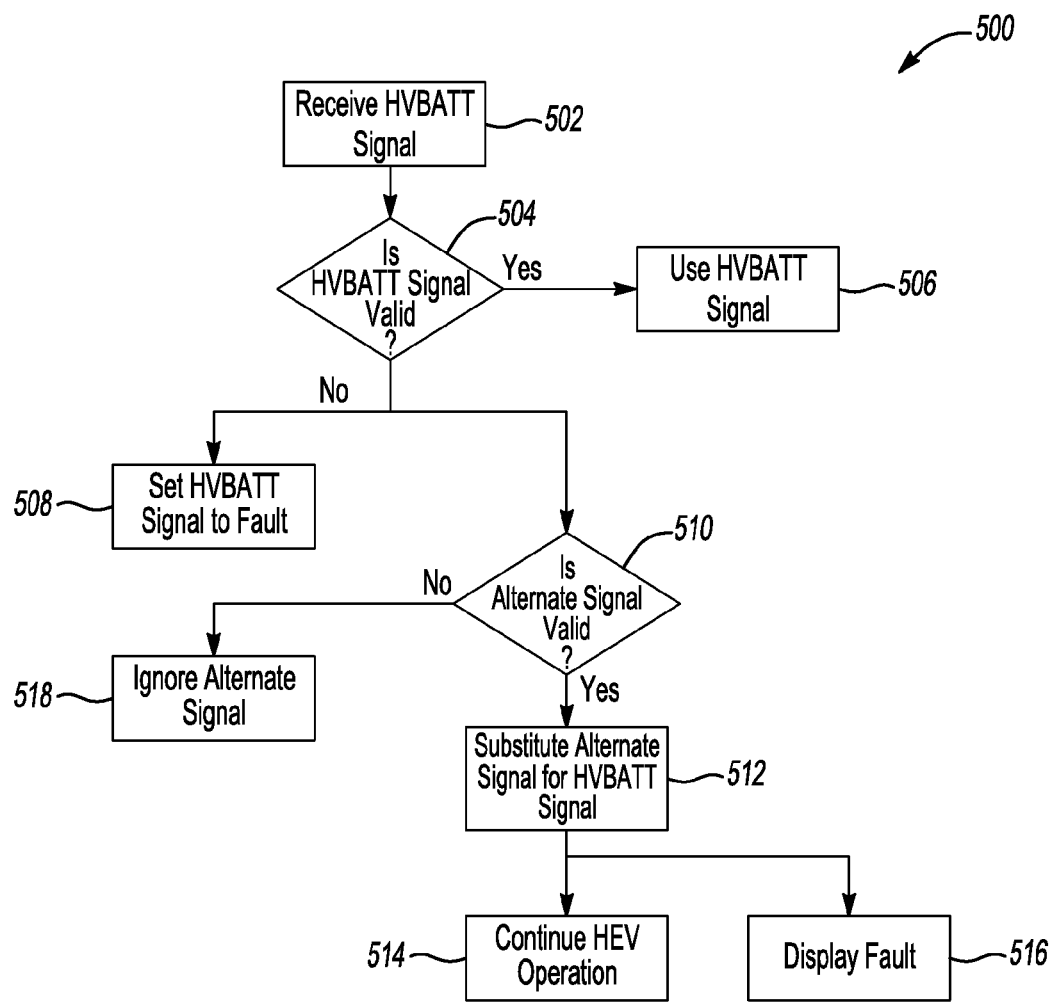
FIG. 9 is a flow chart of another algorithm implemented in the control system of the vehicle of FIG. 1 according to one embodiment of the disclosure.

FIG. 9 illustrates a flowchart 500 of another embodiment of the LOS mode implemented by a controller, or the vehicle control system. A high voltage battery signal, also known as the HVBATT signal, is received by the controller, such as the MGCU, as represented by block 502. The high voltage battery signal is measured by the sensor along the input side of the VVC. Based on the high voltage battery signal provided by the sensor, the controller determines if the high voltage battery signal is valid, as represented by block 504. The high voltage battery signal is valid if the signal is within an acceptable range.

If the HVBATT signal is valid, the controller continues to use then the high voltage battery signal, as represented by block 506, and the VVC may function normally, such as where VVC provides voltage boost output to the inverters and electric machines, as described in FIG. 3 and FIG. 4.

However, if the high voltage battery signal is outside of the acceptable range, the signal is determined to be invalid. When the high voltage battery signal is invalid, then the signal is set to a service condition, as represented by block 508. When the high voltage battery signal is set to the service condition, the MGCU communicates with the HCU to determine whether there is an alternative signal available to provide the high voltage battery signal in order to prevent shut down or short of the electric machines and the vehicle.

As previously described, the HCU is able to communicate through the vehicle network, such as CAN. For example, the HCU is able to communicate with the BCM on the vehicle network to receive an alternate battery voltage signal from the BCM. The alternate battery voltage signal from the BCM may be a measured voltage that is measured within the BCM. Alternatively, the alternate battery voltage signal may be inferred from other battery readings in the BCM or other vehicle system controllers communicating with the vehicle network.

The MGCU determines if the alternate voltage signal provided from the vehicle network is valid, as represented by block 510. The alternate battery voltage signal is considered to be a valid signal if the battery voltage is within an acceptable range. If the alternate battery voltage signal from the BCM is considered to be valid, then the alternate battery voltage signal is substituted in for the HVBATT, as represented by block 512. By using the alternate voltage signal in place of the HVBATT, the VVC can continue to operate normally, as represented by block 514. In normal operation, the VVC can provide voltage boost from the battery voltage on the input side to the inverter and electric machines on the output side. Therefore, with the on-the-fly substitution of the alternate signals, the electric machines can continue to operate normally, despite the high voltage battery signal.

The vehicle may also display a service indicator for the driver, as represented by block 516. The service condition indicator may be displayed as a wrench light informing the driver of the service condition. The service condition in the high voltage battery signal may be caused by a failure of the sensor. The display may indicate that the sensor needs to be replaced.

If the MGCU determines that alternate signal is not valid, the control system ignores the alternate signal, as represented by block 518. The alternate signal may be invalid if it is beyond an acceptable range or threshold value, for example. If the alternate signal is invalid, it may indicate a secondary service condition.

Figure 10:
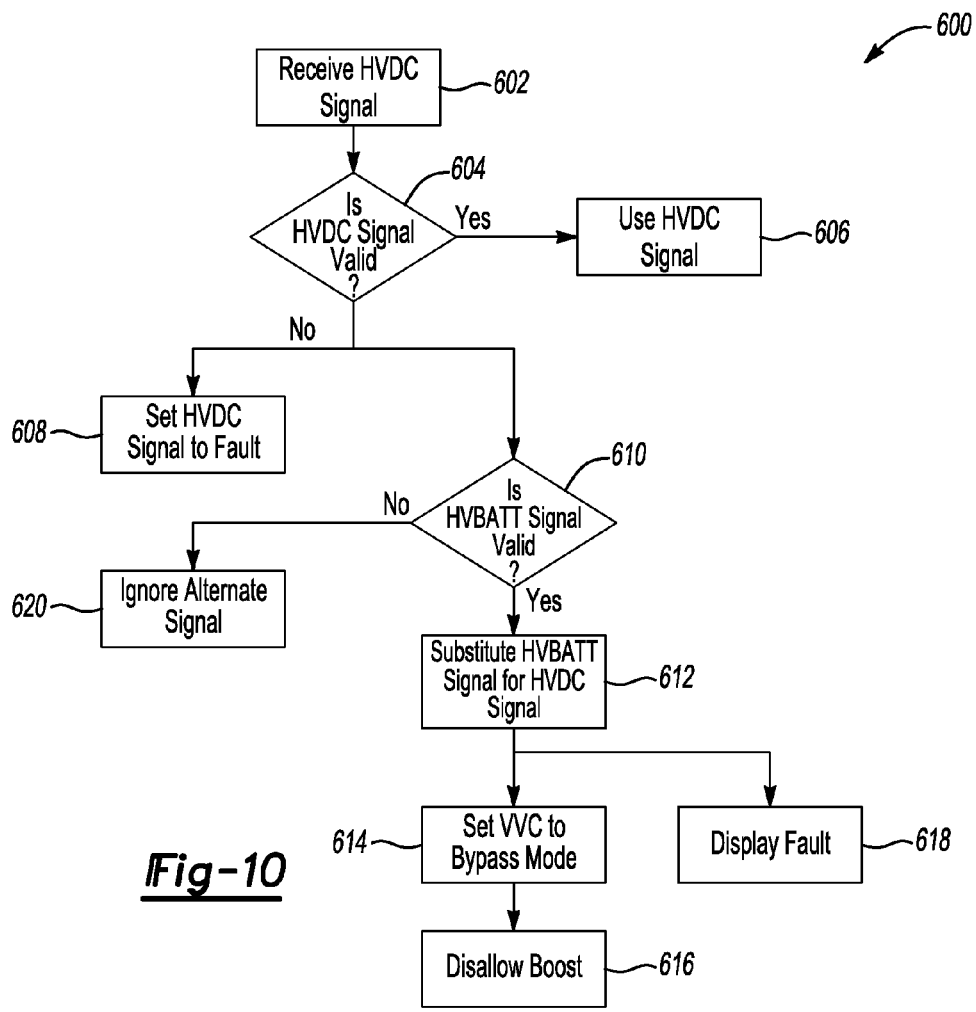
FIG. 10 is a flow chart of another algorithm implemented in the control system of the vehicle of FIG. 1 according to one embodiment of the disclosure.

FIG. 10 illustrates a flowchart 600 of another embodiment of the LOS mode implemented by a controller, or the vehicle control system. A high voltage battery bus signal, also known as the HVDC signal, is received by the controller, such as the MGCU, as represented by block 602. The high voltage bus signal is measured by the sensor along the output side of the VVC. Based on the high voltage bus signal provided by the sensor, the controller determines if the high voltage bus signal is valid, as represented by block 604. The high voltage battery signal is valid if the signal is within an acceptable range.

If the HVDC signal is valid, the controller continues to use the high voltage bus signal, as represented by block 606, and the VVC may function normally, such as where VVC provides voltage boost output to the inverters and electric machines, as described in FIG. 3 and FIG. 4.

However, if the high voltage bus signal is outside of the acceptable range, the signal is determined to be invalid. When the high voltage bus signal is invalid, then the signal is set to a service condition, as represented by block 608. If the signal is considered invalid, the HVDC signal is set to indicate a service condition and LOS mode is implemented to maintain function of the electric machines and to allow the operator of the vehicle to continue driving.

When the high voltage bus signal is set to the service condition, the MGCU tries to substitute the high voltage battery signal, HVBATT from the input side of the VVC, for the high voltage bus signal. The MGCU determines whether the high voltage battery signal is valid, as represented by block 610. It is contemplated that the controller may substitute any HVBATT signal, such as the high voltage battery signal measured by the sensor or the alternate battery voltage signal provided to the MGCU from CAN via the HCU, as discussed above in FIG. 9.

As discussed previously, the high battery voltage signal is considered to be a valid signal if the battery voltage is within an acceptable range. If the high voltage battery voltage signal is considered to be valid, then the HVBATT, is substituted for the high voltage bus signal, as represented by block 612.

When using the high voltage battery signal in place of the high voltage bus signal, the VVC can continues to operate but the VVC is set to a LOS mode, as represented by block 614. In the LOS mode, the VVC is set to a bypass mode. In the bypass mode, the VVC is disabled from providing voltage boost, as represented by block 616. The vehicle may also display a service indicator for the driver, as represented by block 618. Again, the service indicator may be displayed as a wrench light informing the driver of the service condition. The service condition in the high voltage bus signal may be caused by a failure of the sensor. The display may indicate that the sensor needs to be replaced.

If the MGCU determines that HVBATT signal is not valid, the control system ignores the alternate HVBATT signal, as represented by block 620. The alternate signal may be invalid if it is beyond an acceptable range or threshold value, for example. If the alternate signal is invalid, it may indicate a secondary service condition in the HVBATT signal.

It should be understood that, while references have been made to disabling and enabling the motor, similar algorithms are contemplated to apply to the motor 16, generator 32, inverter 15 and VVC 60. In other words, if a service condition is present in any of the motor 16, the generator 32, the inverter 15 or the VVC 60, the methods described above can apply to any of these components and other powertrain components.

Figure 11:
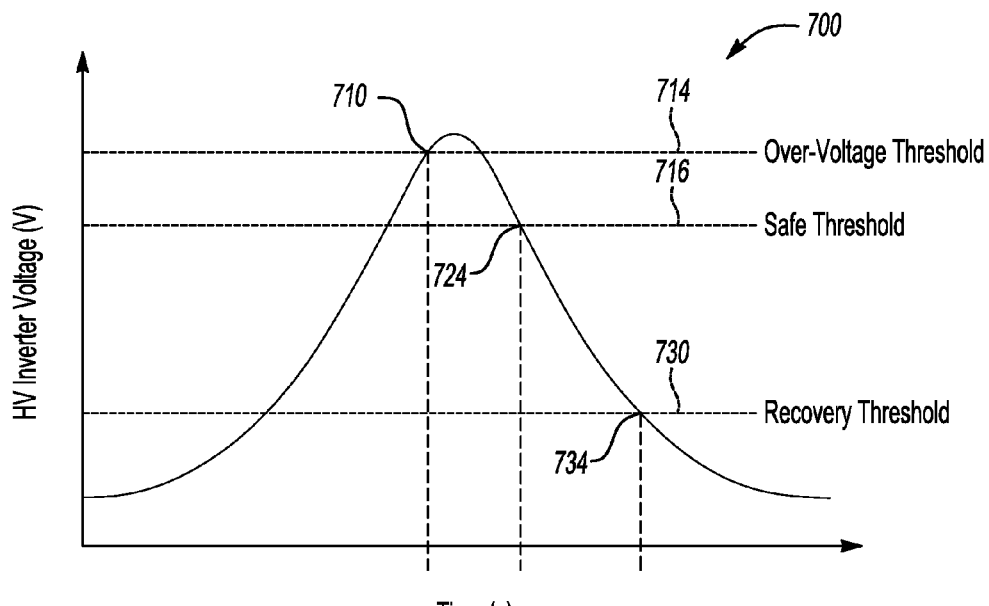
FIG. 11 is a graph illustrating a system response and recovery strategy of the vehicle of FIG. 1 according to one embodiment of the disclosure.

FIGS. 11-12 illustrate a recovery strategy for hardware service conditions. Hardware conditions in one subsystem can affect other subsystems and trigger additional service conditions which are set. One of the more common detections that are set as a result of failures is an over-voltage condition of an inverter 15. The over-voltage condition is set by inverter hardware. When triggered, the hardware may disable the motor inverter 15 and/or the generator inverter 15, as well as the VVC 60, which leads to a vehicle QOR. Other hardware detections that are less severe than hardware over-voltage conditions are IGBT service conditions. A service condition of any IGBT 92 on may disable only the affected device or devices. However, IGBT service conditions may be set due to transient events and not due to actual physical damage to the IGBT. The service condition may occur on any IGBT 92 associated with the inverter 15 for the motor 16 or generator 32, or one or both IGBT 92 on the VVC 60.

According to one embodiment, the vehicle control system 12 is configured to recover from hardware service condition detections such as those related to IGBT conditions. FIG. 11 is a voltage chart 700 of an inverter illustrating a strategy for recovering an over-voltage fault. As shown in FIG. 11, hardware diagnostics detect an inverter voltage at a point 710 when the voltage exceeds above an over-voltage threshold 714.

When the voltage exceeds the over-voltage threshold 714, the control system may disable the motor 16, generator 32 and VVC 60. The MGCU 70 may also be set to a service indicator to indicate the hardware issue.

From the point 710 when the inverter voltage exceeds the threshold 714, the control system strategy waits for the voltage to drop below a safety threshold 716. The control system may wait a predetermined time, or a set a counter, as shown further in FIG. 12, for example. At the point 724 when the inverter voltage is below the safety threshold 716, the control system resets the hardware to remove the action latched on each of the devices such as the motor 16, generator 32 and VVC 60. Once the service condition is reset, the VVC 60 may be forced into a temporary bypass LOS mode. As discussed previously, the bypass mode of the VVC may allow the high voltage from the electric machines to be quickly dissipated to the low voltage input side of the VVC. The VVC bypass mode may prevent the probability subsequent voltage spikes of the motor 16, generator 32, and/or VVC 60 causing secondary service conditions. Recovering from a hardware inverter over-voltage condition as quickly as possible within the same drive cycle thus reduces the number of situations where the vehicle may be immobilized due to secondary service conditions and allows extended vehicle availability.

The control system strategy waits for the voltage to drop below a recovery threshold 730. At the point 734 when the inverter voltage is below the recovery threshold 730, the control system recovers the MGCU service setting. In the absence of other service conditions, the motor 16, generator 32 and VVC 60 recover from respective LOS modes. If there are other service conditions present, each device may remain in its appropriate mode.

FIG. 12 is a flow chart illustrating an example of the recovery strategy of the motor 16, generator 32 or VVC 60 based on a service condition in one of the IGBT 92. As shown, FIG. 12 illustrates a flowchart 800 of another embodiment of the LOS mode implemented by a controller, or the vehicle control system. The controller, such as the MGCU, receives an IGBT service signal for a specific device, as represented by block 802. The IGBT service signal may be associated with any of the devices such as the motor 16, generator 32 or the VVC 60.

An IGBT service condition is detected by motor inverter 15, generator inverter 15, or VVC 60 hardware. The IGBT service signal is then sent to the controller 12. Based on the IGBT service signal, the controller determines if the IGBT service signal reading from the last loop is equal to a current IGBT service signal reading, as represented by block 804. If the current IGBT service signal reading is equal to the last loop, the control system may initiate a lower speed execution rate so that additional diagnostics can be performed to determine if one of the IGBT 92 is remains in a service condition, as represented by block 806. If the current IGBT service signal reading is not equal to the last loop, the control system determines the state of the IGBT 92, as represented by block 810.

If the IGBT 92 continues to indicate a service condition or have a failure, an IGBT counter is incremented, as represented by block 820. The control system sets a LOS mode for the device to temporarily disable the device, as represented by block 822, and then checks to determine if the motor inverter 15, or generator inverter 15, or VVC 60 is still indicating a service condition or disabled, as represented by block 806.

However, if there is no IGBT service condition, the control system decreases the IGBT counter, as represented by block 826. The control system deteremines if the IGBT service condition counter is zero, as represented by block 828. If the IGBT service condition counter is zero, the LOS mode can be exited, as represented by block 830. Once the IGBT counter is set to zero and the LOS mode is cleared, the control system may also re-enable any devices and return to normal function. The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a hybrid-electric vehicle comprising:
    disabling, by a controller, an electric machine and a variable voltage converter (VVC) when an electric-machine voltage exceeds an over-voltage threshold; and
    upon determining the electric-machine voltage decreased to at least a second threshold being less than the over-voltage threshold:
    re-enabling, by the controller, the electric machine and the VVC.

2. The method of claim 1 wherein the controller re-enables the electric machine during a drive-cycle.

3. The method of claim 2 wherein when the controller disables the VVC the controller sets the electric machine to a limited-operation mode, wherein the limited-operation mode enables the vehicle to maintain vehicle propulsion during the drive-cycle.

4. The method of claim 1 further comprising:
    commanding, by the controller, the VVC to function in a mode in which a voltage from a high voltage electric connection is routed to a battery to quickly dissipate the high voltage in response to the electric machine exceeding the over-voltage threshold.

5. The method of claim 1 wherein in response to the electric machine exceeding the over-voltage threshold, the controller sets the VVC to a mode that prevents providing a boost voltage to at least one other electric machine.

6. The method of claim 1 wherein the over-voltage threshold occurs on at least one insulated-gate bipolar transistor (IGBT).

7. The method of claim 6 wherein the IGBT is associated with at least one of the VVC and the electric machine.

8. A vehicle comprising:
    a traction battery;
    an electric machine;
    a variable voltage converter (VVC); and
    at least one controller configured to:
        detect when a voltage of one of the electric machine and the VVC exceeds an over-voltage threshold;
        disable the electric machine and the VVC in response to the voltage exceeding the over-voltage threshold;
        operate the VVC in a limited-operation mode in response to determining the voltage decreased to at least a second threshold being less than the over-voltage threshold;
        in response to determining the voltage decreased to at least a third threshold being less than the second threshold and the over-voltage threshold:

re-enabling the electric machine; and
changing the VVC from the limited operation mode to a full-operation mode,
wherein the limited-operation mode enables the vehicle to maintain vehicle propulsion during a drive-cycle.

9. The vehicle of claim 8 wherein the electric machine includes at least one inverter coupled to the electric machine, wherein voltage of the electric machine or the at least one inverter exceeds the over-voltage threshold.

10. The vehicle of claim 8 wherein voltage exceeding the over-voltage threshold occurs on at least one insulated-gate bipolar transistor (IGBT).

11. The vehicle of claim 10 wherein the IGBT is associated with at least one of the VVC and the electric machine.

12. The vehicle of claim 8 wherein the electric machine includes an inverter and the controller is also configured to command the VVC to function in a bypass-mode, wherein in the bypass-mode, voltage from the inverter is routed to a battery while the electric machine is disabled.

13. The vehicle of claim 8 wherein the at least one controller is further configured to re-enable the electric machine during the drive-cycle.

14. A method of controlling a hybrid-electric vehicle comprising:
detecting an over-voltage condition when an electric-machine voltage exceeds an over-voltage threshold;
disabling, by the controller, the electric machine in response to the over-voltage condition;
upon determining the electric-machine voltage decreased to at least a second threshold being less than the over-voltage threshold, setting a variable voltage converter (VVC) to a limited-operation mode, by the controller;
upon determining the electric-machine voltage decreased to at least a third threshold being less than the second threshold and over-voltage threshold:
re-enabling, by the controller, the electric machine; and
changing, by the controller the VVC from the limited-operation mode to a full-operation mode,
wherein the limited-operation mode enables the vehicle to maintain vehicle propulsion during a drive-cycle.

15. The method of claim 14 further comprising re-enabling the electric machine during the drive-cycle.

16. The method of claim 14 wherein the over-voltage condition occurs on at least one insulated-gate bipolar transistor (IGBT).

17. The method of claim 16 wherein the IGBT is associated with at least one of the VVC and the electric machine.

18. The method of claim 14 wherein in the limited-operation mode, the VVC is prevented from providing a boost voltage to at least one other electric-machine.

19. The vehicle of claim 8 wherein the limited-operation mode, the VVC is prevented from providing a boost voltage to at least one other electric-machine.

* * * * *